United States Patent Office  
3,157,689  
Patented Nov. 17, 1964

3,157,689
CYANOETHYLATED AMINO HYDROXY NITRILES
Edgar R. Rogier, Hopkins, Minn., assignor to General Mills, Inc., a corporation of Delaware
No Drawing. Filed Apr. 1, 1960, Ser. No. 19,170
8 Claims. (Cl. 260—465.5)

The present invention relates to the novel cyanoethylated amino hydroxy higher alkylnitriles and their substituted amino derivatives.

These compounds may be used for a large number of purposes such as plasticizers for polyvinyl resins, corrosion inhibitors, sludge inhibiting additives for fuel oils, chemical intermediates, and the like. In addition, these cyanoethylated amino hydroxy higher alkylnitriles serve as valuable intermediates in the production of novel hydroxy polyamines.

The novel compounds of the present invention are those cyanoethylated amino hydroxy higher alkylnitriles which have the formula RCN in which R is an aliphatic hydrocarbon group containing 8 to 24 carbon atoms and has attached to each carbon atom of at least one pair of adjacent carbon atoms a different radical selected from the class consisting of OH and

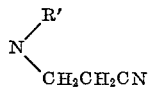

where R' is a member selected from the class consisting of (1) hydrogen, (2) aliphatic groups and (3) aryl groups.

The overall synthesis of these compounds may be illustrated by the following series of reactions using oleic acid as a starting material:

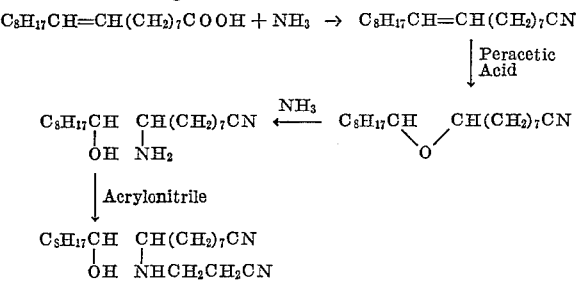

Those unsaturated fatty nitriles prepared by the reaction of ammonia and an unsaturated fatty acid, such as oleic, erucic, eleostearic, linoleic, linolenic, clupanodonic, palmitoleic and palmitolenic acid form convenient starting materials for preparing epoxy nitriles which contain an even number of carbon atoms. Those unsaturated fatty nitriles which are prepared by the reaction of an unsaturated alkyl halide and an inorganic cyanide form convenient starting materials for preparing epoxy nitriles which contain an odd number of carbon atoms.

The unsaturated fatty acids previously referred to occur naturally in animal and vegetable fats and oils such as soybean, safflower, cottonseed, rapeseed, linseed and sardine oils and the like. The previously mentioned unsaturated alkyl halides may be prepared by converting one of the aforementioned fatty acids to an alcohol and reacting that alcohol with a halogen acid to form the alkyl halide.

It will be readily apparent to those skilled in the art that a large number of amino hydroxy nitriles may be prepared by reacting one of the previously described epoxy nitriles with ammonia or a primary amine. The aliphatic primary amines containing 1 to 24 carbon atoms such as methylamine, ethylamine, hexylamine, octylamine and stearylamine; the aryl amines such as the amino phenols; the hydroxyl alkyl amines containing 1 to 4 carbon atoms, such as the ethanolamines; and the polyamines which contain primary amino groups such as propylene and ethylene diamine, and the like are only representative of the many varieties of amine reactants which may be used to split the epoxy group to form the amino hydroxy nitriles which will upon reaction with acrylonitrile yield the compounds of the present invention.

The epoxy ring may be split on either side of the oxygen bond so that the hydroxyl group or amino group may be attached to either of the carbon atoms of the original epoxy group. Accordingly the reaction product may contain both isomeric forms of the compounds as illustrated by the following formulas which represent the compounds obtained when 9,10-epoxystearonitrile is reacted with ammonia:

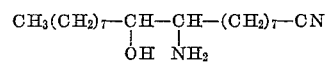

and

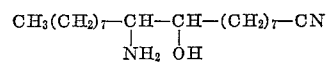

It will be apparent to those skilled in the art that the above mixture of isomeric nitriles upon reaction with acrylonitrile will contain in addition to the monocyanoethylated derivatives, 9-N-(cyanoethyl) amino-10-hydroxystearonitrile and its isomer 10-N-(cyanoethyl) amino-9-hydroxystearonitrile, some of the isomeric dicyanoethylated compounds 9-N,N-di(cyanoethyl) amino-10-hydroxystearonitrile and its isomer 10-N,N-di(cyanoethyl) amino-9-hydroxystearonitrile. In contrast, when primary amines are used to split the epoxy ring, of course, only the monocyanoethylated compounds are obtained upon subsequent cyanoethylation.

While the exact conditions for the cyanoethylation may vary for the compounds falling within the scope of the invention, it can generally be said that the addition of the acrylonitrile to the available hydrogen of the amino group of the amino hydroxy nitrile proceeds satisfactorily when reacted in the presence of methanol at moderate temperatures (60° C. to 90° C.) for varying periods of time (4 to 48 hours).

The present invention is further illustrated by the following examples.

EXAMPLE I

*9(10)-Amino-10(9)-Hydroxystearonitrile*

An autoclave was charged with 250 g. of 9,10-epoxystearonitrile (4.7% oxirane oxygen), 125 g. of methanol and 166 g. of anhydrous ammonia. The reaction mixture was then agitated and heated at 130 to 135° C. for 9 hours at 750 p.s.i.g. pressure. After passing the crude reaction product through a sulfonic acid ion exchange resin in the acid form and vacuum distillation at 2 mm. Hg a yield of 163 grams of 9(10)-amino-10(9)-hydroxystearonitrile was obtained which had and amine number of 186 (theoretical amine number for $C_{18}H_{36}ON_2$ is 189).

*9(10)-(β-Cyanoethyl)-Amino-10(9)-Hydroxystearonitrile*

Into a 100 ml. round bottom, 3-necked flask equipped with a thermometer, dropping funnel, reflux condenser and magnetic stirrer was placed 50.0 g. of the above prepared 9(10)-amino-10(9)-hydroxystearonitrile and 5.0 g. of methanol. The resulting solution was heated to 75° C. and 9.8 g. of acrylonitrile added, with stirring over a 5 minute period. The reaction mixture was heated to the reflux point (81° C.) and heated under gentle reflux until the pot temperature became constant at 88° C. (7 hours). The unreacted acrylonitrile and the methanol were then removed by heating at 90° C. under vacuum (13 mm.). The resulting 9(10)-(β-cyanoethyl)-amino-10(9)-hydroxystearonitrile weighed 58.3 g. and had a total amine number of 159 (calculated amine number for $C_{21}H_{39}ON_3$ is 160).

EXAMPLE II

*9(10)-Methylamino-10(9)-Hydroxystearonitrile*

Into a flask containing 350 g. of 9,10-epoxystearonitrile (4.65% oxirane oxygen) was added 144 g. of methylamine and 100 ml. of methanol. The mixture was reacted at 150° C. for 4 hours. The catalyst and solvent were then removed as previously described, and the crude reaction product was distilled to yield 9(10)-methylamino-10(9)-hydroxystearonitrile with an amine number of 182 (calculated amine number for $C_{19}H_{38}ON_2$ is 181).

*9(10)-N-(Cyanoethyl)-Methylamino-10(9)-Hydroxystearonitrile*

Into a 150 ml. round bottom, 3-necked flask equipped with a thermometer, dropping funnel, reflux condenser and magnetic stirrer was placed 75.4 g. of the above prepared 9(10)-methylamino-10(9)-hydroxystearonitrile and 7.5 g. of methanol. The resulting solution was heated to 75° C. and 19.5 g. of acrylonitrile added with stirring over a 5 minute period. The reaction mixture was then heated to reflux temperature and mantained at gentle reflux (85° C.) for 5½ hours. The unreacted acrylonitrile and the methanol were then removed by heating (90° C.) under vacuum (13 mm.).

The resulting 9(10)-N-(cyanoethyl)-methylamino-10(9)-hydroxystearonitrile weighed 87.3 g. and had a total amine number of 158 (calculated for $C_{22}H_{41}ON_3$ is 154).

EXAMPLE III

*9(10)-Dodecylamino-10(9)-Hydroxystearonitrile*

Into a flask containing 691 g. of 9,10-epoxystearonitrile (4.65% oxirane oxygen) was added 740 g. of n-dodecylamine (amine number 303) and 124 g. of ethylene glycol. The mixture was reacted for 8.8 hours at 150° C. After passing the crude reaction product through a sulfonic acid ion exchange resin in the acid form and subsequent vacuum distillation as described in Example I, a 92% yield as based on the weight yield of amine fraction and oxirane content of the 9,10-epoxystearonitrile of 9(10)-dodecylamino-10(9)-hydroxystearonitrile was obtained which had an amine number of 120 (calculated amine number for $C_{30}H_{60}ON_2$ is 121).

*9(10)-N-(Cyanoethyl)-Dodecylamino-10(9)-Hydroxystearonitrile*

Into a round bottom, 3-necked flask equipped with a thermometer, dropping funnel, reflux condenser and magnetic stirrer was placed 50.0 g. of the above prepared 9(10)-dodecylamino-10(9)-hydroxystearonitrile and 9.2 g. of methanol. The resulting solution was heated to 70° C. and 16.0 g. of acrylonitrile added with stirring. The reaction mixture was then heated to and maintained at gentle reflux (80° C.) for 48 hours. The unreacted acrylonitrile and the methanol were then removed by heating the mixture at 90° C. under vacuum (13 mm.).

The resulting 9(10)-N-(β-cyanoethyl)-dodecylamino-10(9)-hydroxystearonitrile weighed 101 g. and had an amine number of 110 (calculated amine number for $C_{33}H_{63}ON_3$ is 108).

EXAMPLE IV

*9(10)-Di-(β-Cyanoethyl)Amino-10(9)-Hydroxystearonitrile*

Into a 500 ml., r.b., 3-necked flask equipped with thermometer, reflux condenser and magnetic stirrer was placed 100 g. of 9(10)-β-cyanoethylamino-10(9)-hydroxystearonitrile (amine number 160), 25 g. acrylonitrile, 10 g. methanol (absolute) 6 g. glacial acetic acid and 2 g. of 85% phosphoric acid. This reaction mixture was heated to the reflux point (78° C.) and maintained at that temperature for 96 hours. The reaction was then cooled and the mixture taken up in diethyl ether and washed with 5% sodium carbonate and finally three times with water. After drying, the solvent was removed by distillation and then heated at 60° C. under high vacuum to remove unreacted acrylonitrile, methanol and water. The resulting product weighed 103 g. Analysis of the product showed the following results:

|  | Calcd. for $C_{24}H_{42}ON_4$ (Diadduct) | $C_{21}H_{31}ON_3$ (Monoadduct) | Found |
| --- | --- | --- | --- |
| Total Amine No | 139 | 160 | 144 |

The product was purified by ion exchange methods. A styrene butadiene methacrylate carboxylic acid ion exchange column was prepared containing 960 cc. resin or 1.64 equivalents capacity. This was converted from the ammonia form to the acid form with 10% aqueous hydrochloric acid. The resin was washed with water till Cl⁻ free, and was thoroughly wetted with methanol. To this was charged 500 ml. of a methanol solution containing 46 g. of the above product. Methanol was used to elute the resin and the effluent methanol was collected in 500 ml. portions and any organic matter recovered. The first eluate fraction (500 ml.) contained 0.5 g. non-methanol organic material. The next 1000 ml. contained 29 g. of product shown to be 9(10)-di-(β-cyanoethylamino)-10(9)-hydroxystearonitrile. Approximately 2 g. more was recovered from the succeeding 3000 ml. of eluate, and this was followed by 2000 ml. eluate containing no recoverable organic fatty materials. Elution was begun with methanol containing 3% $NH_3$, eventually collecting 17 g. of a second material in 4000 ml. of eluate.

The dicyano substituted amine had insufficient base strength in this case to be picked up by the weakly acid carboxylic ion exchange resin. Consequently it passed through and the monocyanoethyl substituted amine was exchanged by the resin and thereby separated. The purified dicyano product had an amine number

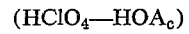

of 133. After acetylation with acetic anhydride, the amine number was 135, indicating the product was essentially the dicyano compound.

EXAMPLE V

*9(10)-Di-(β-Cyanoethyl)Amino-10(9)-Hydroxystearonitrile*

A mixture of 160 g. of 9(10)-amino-10(9)-hydroxystearonitrile (amine number 188, mol. wt. 296, 0.54 mole), 60 g. acrylonitrile (1.13 mole), 20 g. absolute methanol, 12 g. glacial acetic acid, and 4 g. of 85% phosphoric acid was heated in a 1000 ml. 3-necked r.b. flask with stirrer, condenser and thermometer. The reaction was maintained at 78 to 82° C. throughout the 89 hour reaction period. The product was cooled, taken up in diethyl ether, and washed with sodium hydroxide solution and finally with water. The solvent and unreacted acrylonitrile were removed at elevated temperatures under reduced pressure.

|  | Sample 1, 15 hours | Sample 2, 24 hours | Sample 3, 89 hours |
| --- | --- | --- | --- |
| Total Amine No | 153 | 151 | 141.7 |

It will be readily apparent to those skilled in the art that by varying the primary amine reactant and/or epoxynitrile used in preparing the amino hydroxynitrile to be cyanoethylated a wide variety of cyanoethylated amino hydroxystearonitriles may be prepared which are within the spirit and scope of the present invention.

The embodiments of the invention which an exclusive property or privilege is claimed are defined as follows:

1. 9-β-cyanoethyl-amino-10-hydroxystearonitrile.
2. 10-β-cyanoethyl-amino-9-hydroxystearonitrile.
3. 9 - di - (β - cyanoethyl) - amino - 10 - hydroxy - stearonitrile.
4. 10 - di - (β - cyanoethyl) - amino - 9 - hydroxy - stearonitrile.
5. 9 - N - (β - cyanoethyl) - methylamino - 10 - hydroxystearonitrile.
6. 10 - N - (β - cyanoethyl) - methylamino - 9 - hydroxystearonitrile.
7. 9 - N - (β - cyanoethyl) - dodecylamino - 10 - hydroxystearonitrile.
8. 10 - N - (β - cyanoethyl) - dodecylamino - 9 - hydroxystearonitrile.

References Cited in the file of this patent
UNITED STATES PATENTS
2,787,633     Harrison et al. _____ Apr. 2, 1957

OTHER REFERENCES

Bergmann: "The Chemistry of Acetylene and Related Compounds," 1948, p. 80.

Cyanamid: "The Chemistry of Acrylonitrile," 2nd ed., 1959, page 163.

---

UNITED STATES PATENT OFFICE
CERTIFICATE OF CORRECTION

Patent No. 3,157,689                  November 17, 1964

Edgar R. Rogier

It is hereby certified that error appears in the above numbered patent requiring correction and that the said Letters Patent should read as corrected below.

Column 2, line 57, for "and" read -- an --; column 4, first table, in the heading to the second column, line 1 thereof, for "$C_{21}H_{31}ON_3$" read -- $C_{21}H_{39}ON_3$ --.

Signed and sealed this 24th day of August 1965.

(SEAL)
Attest:

ERNEST W. SWIDER                    EDWARD J. BRENNER
Attesting Officer                      Commissioner of Patents

UNITED STATES PATENT OFFICE
CERTIFICATE OF CORRECTION

Patent No. 3,157,689                                November 17, 1964

Edgar R. Rogier

It is hereby certified that error appears in the above numbered patent requiring correction and that the said Letters Patent should read as corrected below.

Column 2, line 57, for "and" read -- an --; column 4, first table, in the heading to the second column, line 1 thereof, for "$C_{21}H_{31}ON_3$" read -- $C_{21}H_{39}ON_3$ --.

Signed and sealed this 24th day of August 1965.

(SEAL)
Attest:

ERNEST W. SWIDER                                EDWARD J. BRENNER
Attesting Officer                                   Commissioner of Patents